INVENTOR.
GEORGE R. McCLOUD

Oct. 11, 1960 G. R. McCLOUD 2,956,134
LOAD INTERRUPTER HOUSED FUSE CUTOUTS
Filed Feb. 3, 1959 8 Sheets-Sheet 5

Fig. 11

INVENTOR.
GEORGE R. McCLOUD
BY
ATTORNEY

Oct. 11, 1960 G. R. McCLOUD 2,956,134
LOAD INTERRUPTER HOUSED FUSE CUTOUTS
Filed Feb. 3, 1959 8 Sheets-Sheet 6

INVENTOR.
GEORGE R. McCLOUD
BY
ATTORNEY

Oct. 11, 1960 G. R. McCLOUD 2,956,134
LOAD INTERRUPTER HOUSED FUSE CUTOUTS
Filed Feb. 3, 1959 8 Sheets-Sheet 7

Fig.16

INVENTOR.
GEORGE R. McCLOUD
BY
ATTORNEY

Oct. 11, 1960

G. R. McCLOUD 2,956,134

LOAD INTERRUPTER HOUSED FUSE CUTOUTS

Filed Feb. 3, 1959

INVENTOR.
GEORGE R. McCLOUD

BY

ATTORNEY

United States Patent Office 2,956,134
Patented Oct. 11, 1960

2,956,134

LOAD INTERRUPTER HOUSED FUSE CUTOUTS

George R. McCloud, South Milwaukee, Wis., assignor to McGraw-Edison Company, Milwaukee, Wis., a corporation of Delaware Filed Feb. 3, 1959, Ser. No. 790,849

16 Claims. (Cl. 200—114)

This invention relates to new and useful improvements in a load interrupter fuse cutout and more particularly to fuse cutouts of the housed type wherein provision is made for mechanically breaking the fusible elements subject to a load current in an electric circuit.

The usual practice is to provide in an electrical system, a fuse for interrupting a circuit under overload conditions and in series therewith a circuit breaker which may be manually operated to open the circuit operating under normal load conditions.

Theoretically, the fuse can be used as a circuit breaker; however, the fuse contacts are not designed to withstand the destructive effects of arcing when the contacts are separated under load.

The principal object of this invention is to provide a fuse cutout having a fuse link which will interrupt a circuit under overload conditions and including manually operable means for breaking the fuse link when it is desirable to interrupt the circuit under normal loads, thus dispensing with the use of a circuit breaker in series with the fuse cutout and permitting the operation of the fuse cutout to open circuit position without producing injurious arcing beween the fuse contacts.

Another object of the invention is to provide a housed fuse cutout having a movable door wherein the manually operable fuse link breaking means is actuated by the unidirectional opening movement of the door to provide a single movement direct action easily operated device with a minimum of parts and complexity.

Another object of this invention is to provide a housed fuse cutout when the fuse holder is normally latched in closed position, the link break mechanism is freely manually operable during breaking operation without disturbing the normally latched condition of the fuse holder, there being separate latching mechanism for releasing the fuse holder after breakage of the fuse link and for moving the fuse holder to open circuit position.

Still another object of the invention is to provide a housed type fuse cutout in which the door serves as the mechanical-advantage-imparting operating member for the link break mechanism on opening movement, and as the fuse holding member during circuit closing operation and during normal operation.

Stating this latter object in another manner, it is the intent that the sequence of door operation be provided wherein first closure of the door places the fuse in the circuit where it remains until the door opens, then opening movement of the door directly operates a link break mechanism without reliance upon springs, etc. to set up a link break mechanism or requiring multidirectional movement of the door.

Still another object of this invention is to provide, in one embodiment, a device wherein a link break means and the latching means are sequentially operated by the cutout housing door such that the latching mechanism for releasing the fuse tube from the housed cutout is actuated subsequent to breaking of the fuse link while the door is moved in only one direction.

A further object of this invention is to provide one specific embodiment wherein a latch means extends exteriorly of a housed cutout for manual actuation thereof independent of the link break mechanism so that the operator may selectively choose whether or not to actuate the link break mechanism upon opening of the door to the cutout.

The novel features which are characteristic of the invention are set forth with particularity in the appended claims. The invention itself, both as to its organization and its method of operation, together with additional objects and advantages thereof will best be understood by the following description of specific embodiments when read in connection with the accompanying drawings in which:

Figs. 17, 18, and 19 are semidiagrammatic views showing the relative position of the parts of the embodiment shown in Fig. 16 during sequential operation of the device.

Returning now to Fig. 1 of the drawings, this embodiment of the invention comprises an insulating housing H for a housed fuse cutout having an open front and bottom and a lever comprising a door D of insulating material, for closing the open front. The housing H has a top 15, back portion 16, side portions 17 and 18 which define the aforementioned open front and bottom.

Figure 1:
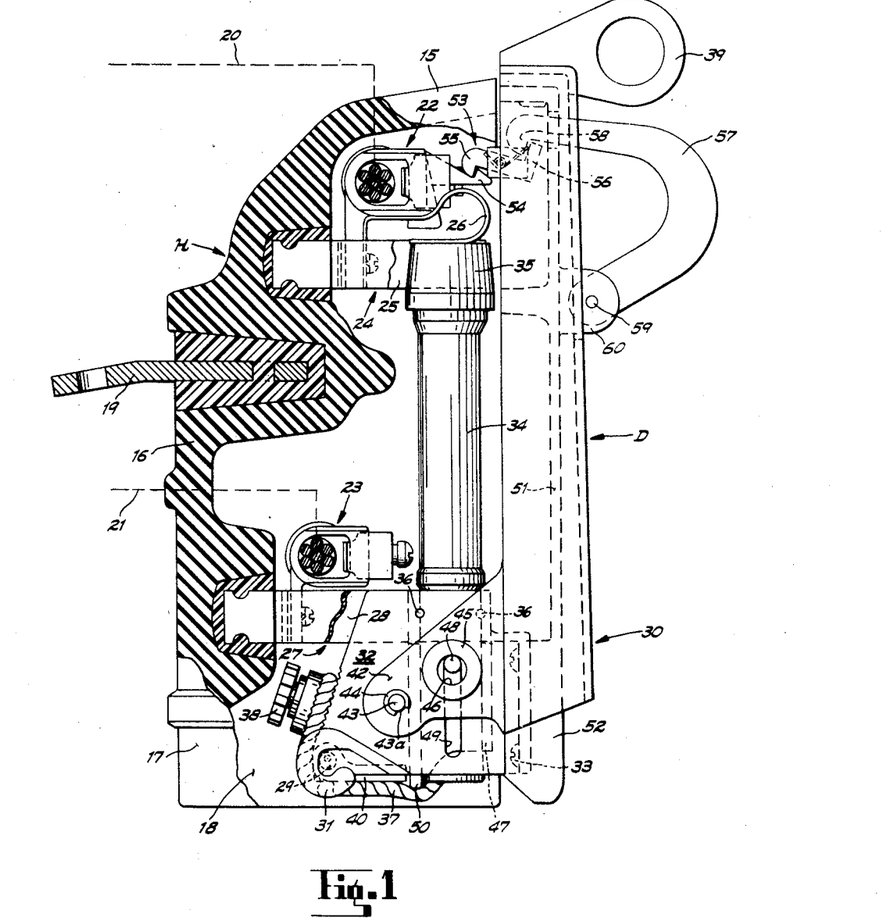
Fig. 1 is a side view, a portion of which is in section, showing one embodiment of the inventive concepts.

In some designs, it is preferable to remove the top 15 of the housing H (not shown) for accommodation of the so called "double venting" fuse tubes. Mounted in the rear wall 16 of the housing and facing outwardly therefrom, intermediate the top and bottom, is a hanger 19 by which the cutout is conveniently mounted to a crossarm or the like.

Interiorly of the housing H and on the inside of the back wall 16 are a pair of spaced terminal means, the upper terminal means being denominated 22 and the lower terminal means 23 for receipt of electrical conductors 20 and 21, respectively and which are here shown semidiagrammatically.

The upper terminal means includes the upper contact assembly 24 which has generally U-shaped side contacts 25 and a spring top contact member 26, whereas the lower terminal means 23 includes the lower contact means 27 which comprises the side contact blades 28 which are generally U-shaped in configuration. The foregoing is conventional and well understood in the art.

A pair of short inwardly projecting pins 29 are fixedly located centrally of and adjacent the lower end of the interior side walls 17 and 18 of the fuse cutout. The pins 29 are adapted to co-act and receive hook-like trunnions 31 formed on a convenient portion of the removable door assembly 30 for pivotal positioning the latter in operative circuit closing position in the cutout, all in accordance with standard procedure. It is to be noted that the pins 29 may be placed on the door assembly 30 and the hook-like bearing 31 may be formed in the side walls 17—18 of the housing if desired.

A fuse unit is normally disposed to electrically connect the upper and lower contact terminals 22, 23 and as here shown generally comprises a fuse tube 34 which is open at its lower end and closed at its upper end by a metallic contact cap 35 which frictionally engages upper contacts 25, 26 of the upper contact means 24.

Near the lower portion of the closure assembly is a generally box-like contact sleeve 32 which includes a portion of the link break means assembly, and which is formed of metal and the outer portion of which is adapted to engage the lower contact means 27. The upper portion of the contact sleeve 32 is formed with an aperture for receiving the tube 34 therethrough; there being a retaining pin 36 in side walls of sleeve 32 and the tube 34 which locates the tube 34 preventing the latter from dropping through the contact sleeve. As shown, and as aforementioned, the lower outside portions of contact sleeve 32 are formed with hook-like trunnions 31 which engage the pins 29 projecting from the sides of the housing to locate the fuse cap 35 and contact sleeve 32 relative to their respective contacts.

A fuse link 37 is normally disposed within the fuse tube 34 in conventional fashion and has a rupturable thermally responsive portion 37a. The end or tail of the fuse link 37 is securely mounted to the contact sleeve 32 by means of a manually tightenable mounting means 38 located on the inwardly facing (to the left in Fig. 1) portion of the contact sleeve 32. Spring loaded flipout lever means 40 may be disposed at the bottom of the contact sleeve 32 adjacent to and engaging the fuse link 37 (as shown at the bottom of Fig. 1) to flip the severed fuse link from within the fuse tube upon rupture of the fusible portion 37a, in accordance with standard procedures.

The door assembly 30 further comprises the door D which is formed with a pair of inwardly extending projections 42 at the lower end thereof. The door D is generally channel like in configuration and is adapted to overlay an inner door 51 which will be more thoroughly described hereinafter. A pull ring 39 is preferably formed at the top of the door D for manual movement thereof.

The inwardly extending portions 42 of the door D are formed with an aperture 43a near the outer extremity thereof. A pair of pivot pins 43 extend within the apertures 43a and may be fixedly mounted to the contact sleeve 32 to provide relative motion therebetween by a pivotal action of the door D. A suitable retaining ring 44 prevents lateral sliding of the door projections 42 upon the pivot pins 43.

A second aperture 46 is formed in each of the projections 42 upwardly of and in spaced relation to the apertures 43a. The apertures 46 are substantially larger than apertures 43a and are formed with a strengthening boss 45 to help take up the mechanical stresses imposed by the link breaking operation as shall become apparent. It should be noted that the relationship of the distance between the pivot point 43 and the aperture 46 is small as compared to the distance between pull ring 39 and pivot 43. This serves to impart a mechanical advantage to a load imposed at aperture 46. Further, the aperture 46 is of sufficient diameter to afford a translation of rotational movement about pivot point 41 to reciprocating movement of a movable link break member without binding the latter.

The link break member per se comprises a cylindrical tube 47, preferably made of metal, which is adapted to surround the lower portion of the fuse tube 34 within the contact sleeve 32. A depending lip 50 (to the left as viewed in Fig. 1) directly engages the extending tail of the fuse link 37. The link break member 47 mechanically engages the operating lever means (comprising the door D, the extensions 42, and the apertures 46) by means of a pair of extending pins or ears 48 which are fixedly mounted on the upper portion of member 47. The ears 48 are guided in their downward motion by means of an elongated slot 49 which is formed in the contact sleeve member 32 in axial alignment with the fuse tube 34. Thus, a mechanical advantage, in direct relationship to the distance between the fulcrum pivot pin 43, the point of the load (apertures 46—pins 48), and the end of the door where the force is applied as at pull ring 39. Inasmuch as up to approximately 200 (depends on link size and make used) pounds of pressure must be placed upon the fusible portion 37a of a link 37 of, for example, a 100 amp. link, in order to cause rupture thereof, a considerable mechanical advantage and ruggedness of parts is necessary.

A so called inner door 51 fits within the channel shaped outer door D and is fixedly and rigidly mounted to the contact sleeve casting 32 at its lower extremity 52 by means of bolts or screws or other suitable fastening means 33. The inner door 51 is latched into the position shown in Fig. 1 of the drawing by latching means 53 at the top end of the inner door.

Figure 2:
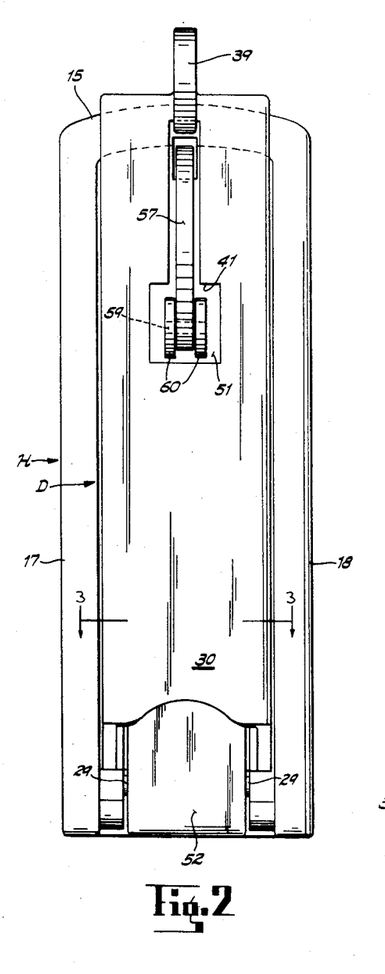
Fig. 2 is a front elevational view of the device shown in Fig. 1.
Figure 3:
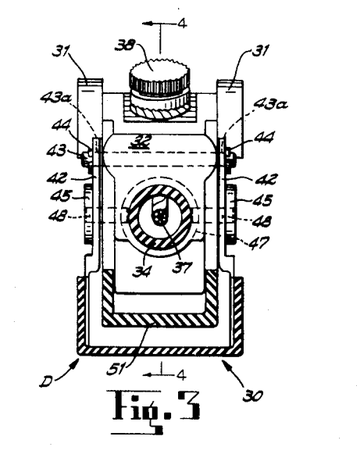
Fig. 3 is a sectional view along lines 3—3 of Fig. 2.
Figure 4:
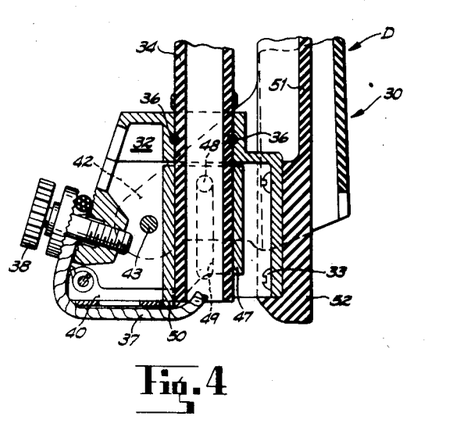
Fig. 4 is a sectional view along lines 4—4 of Fig. 3.
Figure 5:
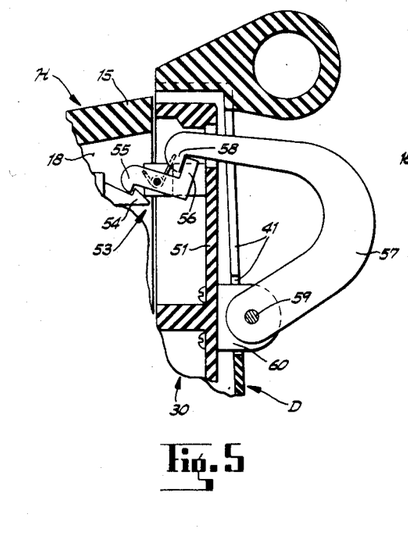
Fig. 5 is a fragmentary sectional view of the upper right hand portion of Fig. 1 showing the cooperation of the parts when the doors are in latched relation to the fuse cutout.
Figure 6:
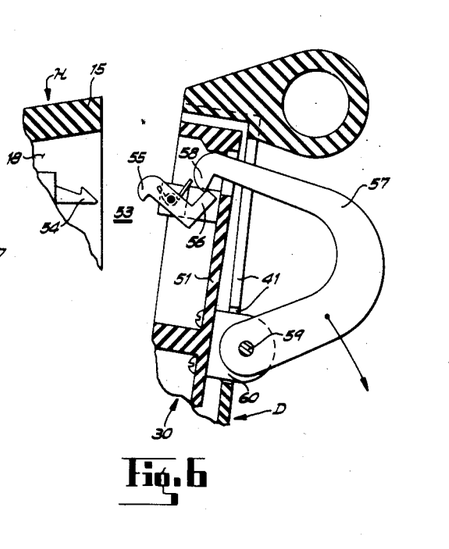
Fig. 6 is a fragmentary sectional view similar to Fig. 5 showing the same parts in an unlatched relationship.

The latching means 53 comprises a hook-like member 54 which is firmly and fixedly attached to the upper terminal means 22 and projects outwardly therefrom. A spring loaded hook link member 55 is pivotally mounted on door 51 and has a cooperating face for engaging latch member 54. Means for unlatching members 54 and 55 is provided by an unlatching member 57 having an inwardly downwardly extending hook-like extension 58 at its upper terminus engageable with an upstanding portion 56 on pivotal link member 55. Unlatching member 57 is pivotally mounted on pin 59 which is fixedly mounted in suitable outwardly extending bosses 60 of the inner door 51. As shown in Figs. 2, 5 and 6, the bosses 60 and the unlatching member 57 extend through an aperture 41 formed in the outer door D. Thus, if desired, projecting unlatching member 57 can be directly engaged by a hook stick and upon downward pivotal movement thereof (as shown in Fig. 6) unlatches link member 55 from the latching surface of projecting member 54.

Figures 7, 8:
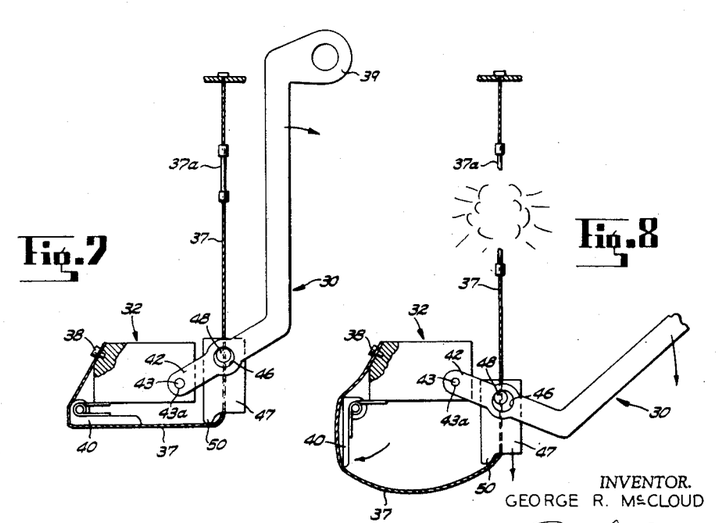
Figs. 7 and 8 are semidiagrammatic views showing the relative positions of the parts of the device of Figs. 1 to 6 during the link break operation.
Figure 9:
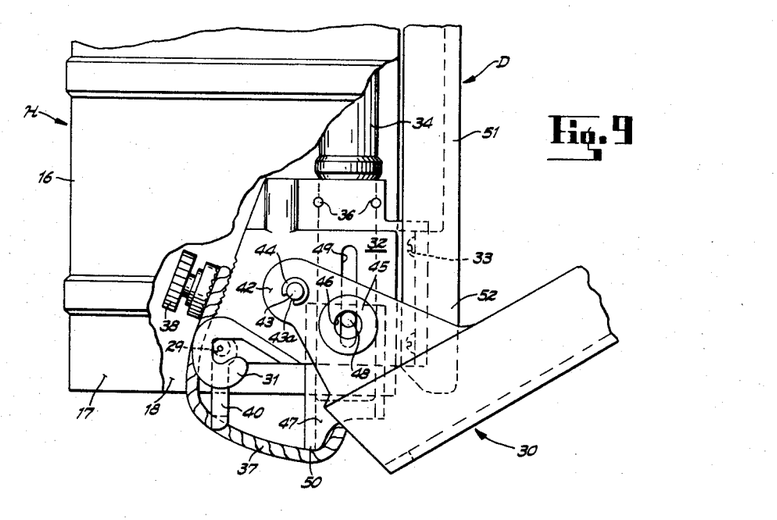
Fig. 9 is a detailed fragmentary view with parts broken away of the lower half of the assembly shown in Fig. 1 during the link break operation of the device.
Figure 10:
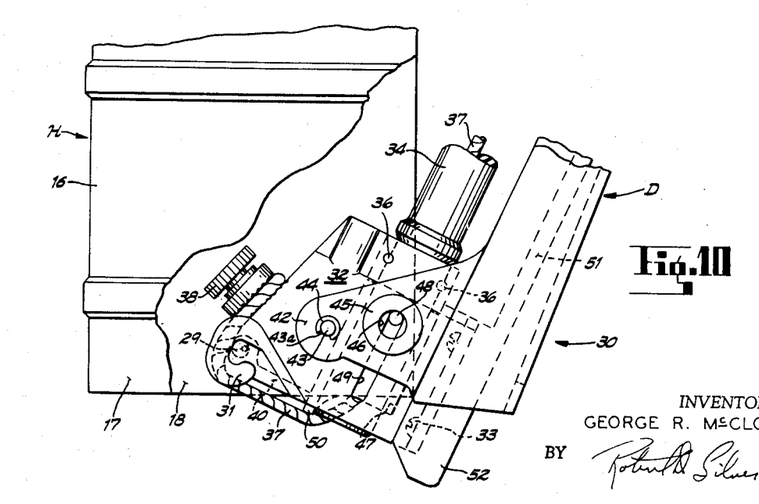
Fig. 10 is a view similar to Fig. 9 showing the relative position of the parts after opening movement by release of the latching means without breaking the link.

The link break operation of the cutout is very simple to operate and on the assumption that the parts are disposed in the position shown in Figs. 1 to 4 of the drawings, is obtained by engaging the pull ring 39 on outer door D and pulling the same in a single downwardly directional movement. This is shown schematically in Figs. 7 and 8 and in mechanical detail in Fig. 9 of the drawings. When the door D is engaged at the pull ring, the door pivots about pivot point 43 and the walls defining the apertures 46 engage the extending ears 48 on member 47 causing the depending lip 50 thereof to move downwardly on link tail 37 thereby exerting sufficient pressure upon the fusible portion 37a to rupture same. Since the outer door D is formed with the aperture 41, the outer door is free to move independent of the inner door 51, the latter remaining in latched position during the link break operation. This prevents any tendency of the fuse tube from moving outwardly during the mechanical link break operation. After the link 37 has broken or ruptured, the operator may return door D to the original position shown in Fig. 1 and/or without so returning the outer door, he may engage member 57 of the latching means on inner door 51 causing the latter to disengage and thereby remove the entire door assembly 30 from the housing. The relative position of the parts in the unlatching operation when the door is first returned to original position is shown in Fig. 6 of the drawings.

It is apparent that this design permits opening of the entire door assembly 30 without operation of the link break means, i.e., the operator may selectively choose whether or not to break the link. To open the cutout without breaking the link, the operator merely engages unlatching member 57 causing the entire door assembly 30 to pivot about pins 29 and then remove the trunnions 31 from engagement therewith.

The alternative embodiment shown in Figs. 11 through 15 is similar in most respects to the embodiment hereinbefore described. Substantially identical parts have retained identical reference numerals. The essential differences between the two embodiments are that the unlatching means for the second embodiment is not accessible from outside of the door D and, thus, selective operation of the device is not afforded. A second distinction lies in the method of obtaining the mechanical advantage between the pivot point 29' and the ears or pins 48' attached to the link break member 47.

Taking the changes up in reverse order, it is seen that the ears or pins 48' are formed on the inward edge (to the left as viewed in drawings 11 to 15) of the link break member 47. The slots 49' in the contact sleeve 32 is also formed slightly to the left as compared with the embodiment of Fig. 1. The inwardly projecting portions 42 of the door D is formed with an elongated curvilinear slot 61, the upper surface of which 62 is adapted to slidably engage extending ears 48' causing the latter to ride downwardly within the slot 49' and thereby impose a mechanical advantage on the link tail 37. Pins 29' located at the extremities of extending portions 42 of the door D serve the dual function of being the mounting pins for the entire assembly 30 and as the fulcrum pivot for the outer door D which gives lever action to the link break member 47 in link break operation. A pull ring 39' at the upper outside portion of the door D is modified slightly since there is no aperture in outer door D for access to the latching means.

Figure 11:
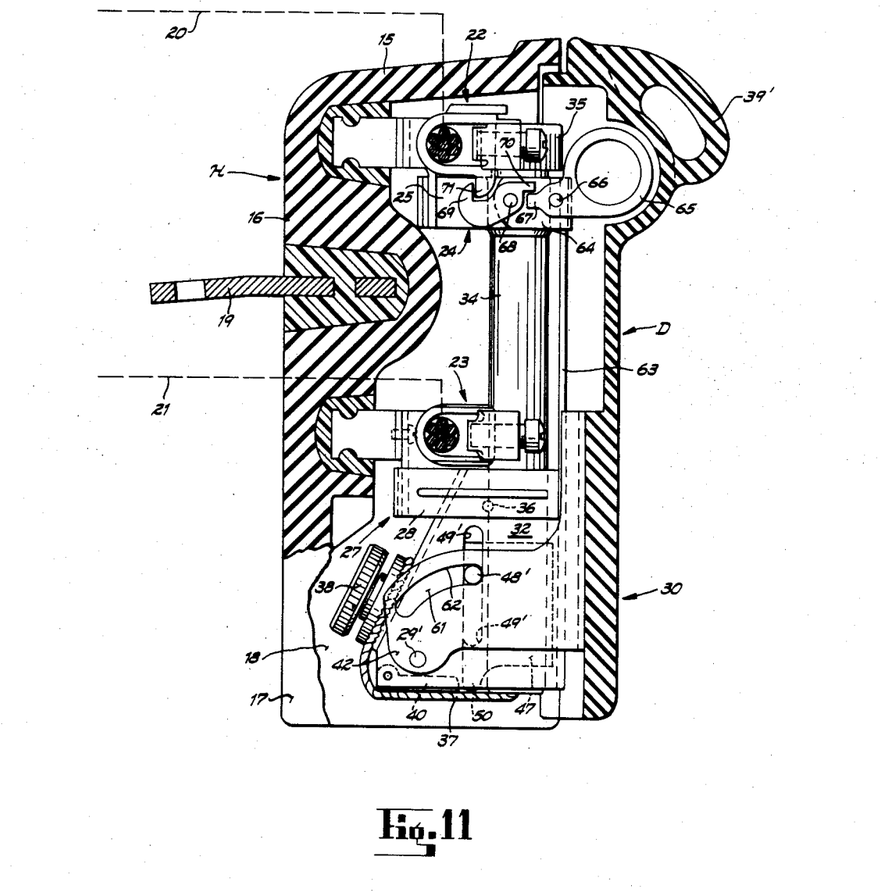
Fig. 11 is a side view, a portion of which is in section, showing an alternative embodiment of fuse cutout employing the inventive concepts.

The inner door of the second embodiment takes the form of a straight bar 63 of insulating material having an upper offset inwardly U-shaped projecting portion 64 which has latch pull ring means 65 pivotally mounted near the apex thereof at point 66. Downward movement of pull ring 65 causes rotational movement thereof about point 66 causing an extending lug 67 thereon to engage face 70 of a pivotal latch member 69 mounted on an arm portion of member 64 by pivot pin 68 causing the latch member 69 to rotate about pin 68. This, in turn, causes disengagement of latch member 69 with fixed latch face 71 which is a fixed part of the upper terminal assembly 22 and thereby causes disengagement and movement of the entire closure assembly 30 about pivot point 29'.

The sequential operation of the link break and unlatching operations is quite well pictorally shown in Figs. 12 through 15 of the drawings.

Figure 12:
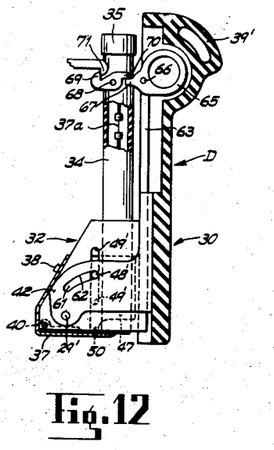
Figs. 12 through 15 are semidiagrammatic views showing the relative position of the parts of the embodiment shown in Fig. 11 during operation of the device.
Figure 13:
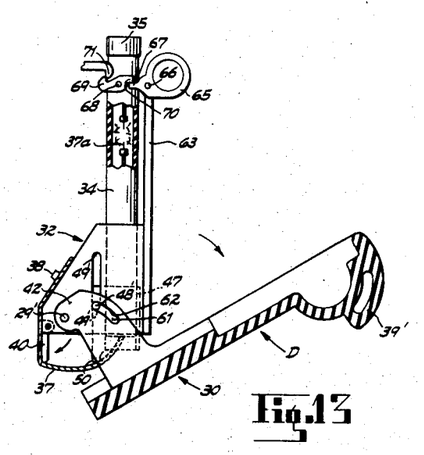
Figures 14, 15:
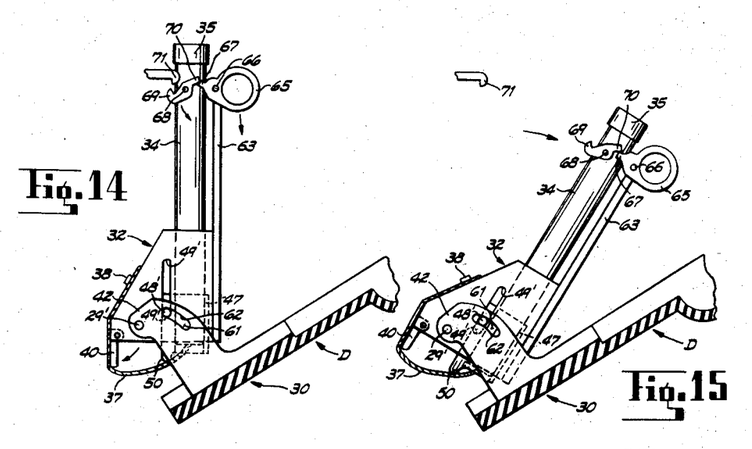

In Fig. 12, the parts are disposed in circuit completing position. In Fig. 13, outer door D has been actuated downwardly to cause link break member 47 to move downwardly to break the fuse link 37. In Fig. 14, the latch mechanism 65 is being actuated and in Fig. 15, the entire closure assembly 30 is being pivoted about pins 29' for removal from the cutout.

The third embodiment shown in Figs. 16 through 19 is substantially similar to the first and second embodiments hereinbefore described. The essential functional differences therebetween being that the link breaking and the unlatching is a sequential operation occasioned by a single downwardly movement of the door D about pivot pins 29'. In the third embodiment the pins 29' serve the same dual function as the second embodiment, i.e., of mounting the closure assembly to the cutout and as the pivotal fulcrum for the door D which is the lever for the link break member 47. The essential difference in the structure of the third embodiment is the formation of the latching means around the lower terminal means 23 rather than the upper terminal means and causing the unlatching means to operate subsequent to the link break operation on the same downward movement of the door D. The structure for affording this function comprises the formation of a slightly longer curvilinear slot 61' in the extending projections or legs 42 of the door D. The pins or ears 48" that extend from the link break member 47 are made slightly longer so as to extend outwardly and engage the depending band shaped link actuating member 76 of the unlatching means.

Figure 16:
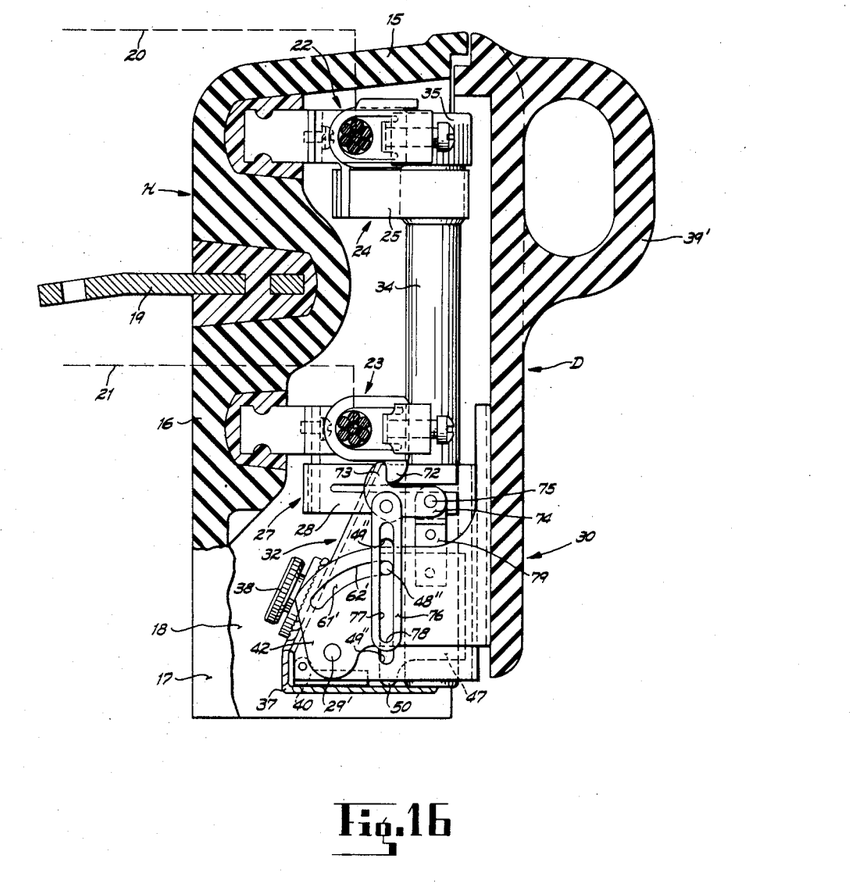
Fig. 16 is a view, a portion of which is in section of another embodiment of fuse cutout embodying the inventive concepts.
Figure 18:
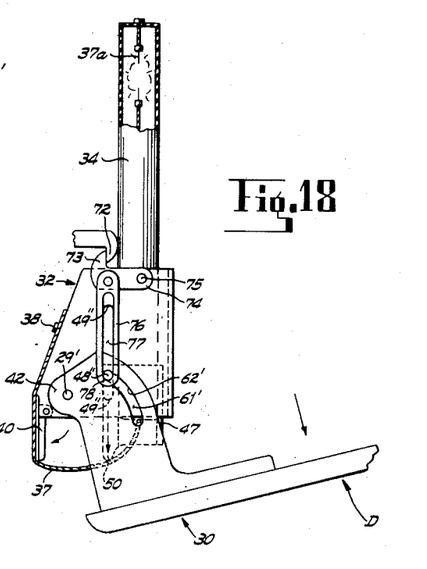
Figure 19:
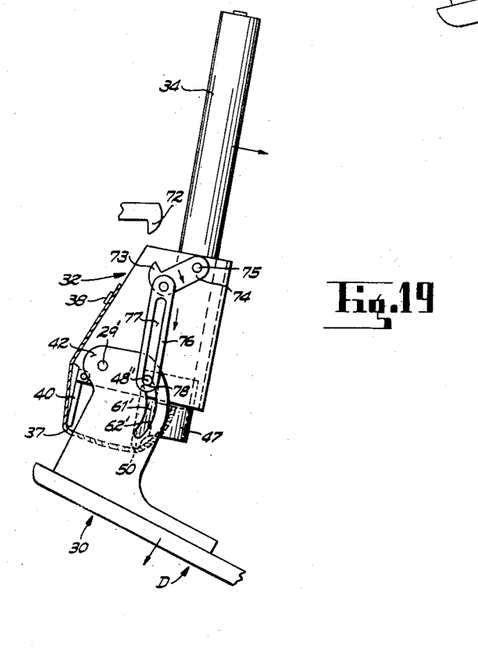

The latch per se comprises a latching face 72 which is fixedly attached to and depends from the lower terminal means 23. A pivotal link member 73 is generally hook-like in shape and pivotally mounted at 75 on a projecting offset lug 79 which is mounted on the side of the contact sleeve 32. The depending band member 76 is pivotally attached to member 73 at its upper end and is formed with an elongated slot 77 having an end portion 78. Thus, when the pins 48" on link break member 47 moves downwardly by pulling on the pull ring 39' on door D, pins 48" engage surface 78 causing downward movement of latch member 73 causing disengagement with face 72 to unlatch the closure assembly. Since pins 48" are attached to link break member 47, extending lip 50 must engage and break link 37 prior to pins 48" engaging the bottom surface 78 of the depending banded member 76. Thus, sequential operation of first breaking the link and then unlatching the device is assured.

Although specific embodiments of the invention have been shown and described, it is with full awareness that many modifications thereof are possible. The invention, therefore, is not to be restricted except as insofar as is necessitated by the prior art and by the spirit of the appended claims.

What is claimed as the invention is:

1. A housed fuse cutout comprising a housing having at least a back portion and a pair of side portions leaving the bottom and front of the said housing exposed, first and second electrical terminal means disposed within said housing, fuse means for electrically bridging said first and second terminal means and including fuse tube means and mechanically rupturable fuse link means therewithin, link break means comprising an elongated cylindrical member disposed in surrounding relation to the lower portion of said fuse tube means and formed with a pair of transversely projecting ears and a bottom edge, said bottom edge engaging said mechanically rupturable fuse link means, and closure means for said cutout comprising an inner portion fixedly mounted relative to said fuse tube means, releasable latch means associated with said inner portion and said first terminal means to latch said fuse tube means in circuit bridging position during operation of said link break means, an outer door portion having a pull ring at the upper extremity thereof and a pair of laterally inwardly extending projections on the lower extremity thereof pivotally mounted relative to said inner portion, and force transmitting means associated with said extending projections and engageable with said projecting ears of said link break member, said force transmitting means being in the form of apertures formed in said pivotally mounted projections which are adapted to receive said projecting ears so that opening movement of said door actuates said link break means to rupture said fuse link means while said fuse means remains in latched circuit bridging relation between said first and second terminal means.

2. A housed fuse cutout comprising a housing having at least a back portion and a pair of side portions leaving the bottom and front of the said housing exposed, first and second electrical terminal means disposed within said housing, fuse means for electrically bridging said first and second terminal means and including fuse tube means and mechanically rupturable fuse link means therewithin, link break means comprising an elongated cylindrical member formed with a depending lip portion and a pair of transversely extending ears, said link break member being disposed in surrounding relation to and said depending lip engaging said mechanically rupturable fuse link means, and closure means for said cutout comprising generally box-like contact sleeve means disposed in surrounding relation to said link break member and formed with elongated guide apertures for receipt of said projecting ears, an inner portion fixedly mounted relative to said contact sleeve means, releasable latch means associated with said inner portion and said first terminal means to latch said fuse tube means in circuit bridging position during operation of said link break means, an outer door portion having a pull ring at the upper extremity thereof and a pair of laterally inwardly extending projections on the lower extremity thereof, the end portions of said projections being pivotally mounted to said contact sleeve means, and force transmitting means being in the form of apertures formed in said pivotally mounted projections which are aligned with said guide apertures in said contact sleeve means and also adapted to receive said projecting ears, said force transmitting apertures being spaced from the pivotal connection of said projections to said contact sleeve, a much shorter distance than the distance to said pull ring, so that opening movement of said door actuates said link break means to rupture said fuse link means while said fuse means remains in latched circuit bridging relation between said first and second terminal means.

3. A housed fuse cutout comprising a housing having at least a back portion and a pair of side portions leaving the bottom and front of the said housing exposed, first and second electrical terminal means disposed within said housing, closure means for said cutout including door means and fuse means for electrically bridging said first and second terminal means, said fuse means including fuse tube means and mechanically rupturable fuse link means therewithin, link break means engaging said mechanically rupturable fuse link means, said door means having lateral projections extending beyond said fuse tube means in a vertical plane, the ends of said lateral projections being pivotally mounted, a portion of said lateral projections in alignment with said fuse tube means operatively disposed for engagement with said link break means so that only pviotal downward opening movement of said door means actuates said link break means to rupture said fuse link means.

4. A housed fuse cutout as set forth in claim 3 including latch means for fixedly holding said fuse tube means in engagement with said first and second terminal means during opening movement of said closure means.

5. A housed fuse cutout comprising, in combination, a housing, first and second electrical terminal means disposed within said housing, a member releasably pivoted on said housing, fuse means for electrically bridging said first and second terminal means and including a fuse tube affixed to said member and a mechanically rupturable fuse link within said fuse tube, means adapted, when operated, to break said fuse link, closure means for said housing pivotally mounted on said member, said fuse tube, said member, and said closure means constituting a unitary assembly, force-multiplying means associated with said closure means and connected to said link break means, said link break means being actuated by said force multiplying means upon pivotal downward opening movement of said closure means to break said fuse link, releasable means for normally latching said member relative to said housing in a position wherein said fuse tube is in engagement with said first and second terminal means, said closure means being operable between open and closed positions while said member is latched, said latching means having a portion accessible from the exterior of said housing when said closure means is in closed position and said portion being adapted when actuated to release said latching means and thus permit removal of said unitary assembly from said housing.

6. A housed fuse cutout comprising, in combination, a housing, first and second electrical terminal means disposed within said housing, an assembly releasably pivoted on said housing including fuse means for electrically bridging said first and second terminal means, said fuse means including a fuse tube and a mechanically rupturable fuse link within said fuse tube, said assembly also including closure means for said housing pivotable relative to said fuse tube, means adapted, when operated, to break said fuse link and being operable in response to pivotal opening movement of said closure means to break said fuse link, releasable means for normally latching said fuse tube relative to said housing in a position wherein said fuse tube is in engagement with said first and second terminal means, said closure means being operable between open and closed positions while said fuse tube is latched and said latching means having means accessible from the exterior of said housing when said closure means is in closed position for releasing said latching means to permit removal of said assembly from said housing.

7. A housed fuse cutout comprising, in combination, a housing, first and second electrical terminal means disposed within said housing, an assembly releasably pivoted on said housing including fuse means for electrically bridging said first and second terminal means, said fuse means including a fuse tube and a mechanically rupturable fuse link within said fuse tube, said assembly also including closure means for said housing pivotable relative to said fuse tube, means adapted, when operated, to break said fuse link and being operable in response to pivotal opening movement of said closure means, means operatively engaging said closure means and said link break means for multiplying a force imparted to said closure means urging it to open position into a greater force tending to break said fuse link, releasable means for normally latching said fuse means relative to said housing in a position wherein said fuse means is in engagement with said first and second terminal means, said closure means being operable between open and closed positions while said fuse means is latched and said latching means having means accessible from the exterior of said housing when said closure means is in closed position for releasing said latching means to permit removal of said assembly from said housing.

8. A housed fuse cutout comprising, in combination, a housing, first and second terminal means disposed within said housing, an assembly releasably pivoted on said housing and including fuse means for electrically bridging said first and second terminal means, said fuse means including a fuse tube and a mechanically rupturable fuse link within said fuse tube, said assembly also including closure means for said housing pivotable relative to said fuse tube, means adapted, when operated, to break said fuse link and being operable in response to downward pivotal movement of said closure means to break said fuse link, and releasable means for normally latching said assembly in a position wherein said fuse means is in engagement with said first and second terminal means, said closure means being movable between open and closed position while said assembly is latched and said latching means being releasable to permit removal of said assembly from said housing.

9. A housed fuse cutout comprising, in combination, a housing, first and second terminal means disposed within said housing, an assembly releasably pivoted on said housing and including fuse means for electrically bridging said first and second terminal means, said fuse means including a fuse tube and a mechanically rupturable fuse link within said fuse tube, said assembly also including closure means for said housing pivotable relative to said fuse tube, means adapted, when operated, to break said fuse link, means operatively engaging said closure means and said link break means for multiplying a downward pivotal opening force imparted to said closure means into a greater force tending to break said fuse link, and means for normally latching said assembly in a position wherein said fuse means is in engagement with said first and second terminal means, said closure means being movable between open and closed positions while said assembly is latched and said latching means being releasable to permit removal of said assembly from said housing.

10. A housed fuse cutout comprising, in combination, an insulating housing, first and second electrical terminal means disposed within said housing, a member releasably pivoted on said housing, fuse means for electrically bridging said first and second terminal means and including a fuse tube affixed to said member and a mechanically rupturable fuse link within said fuse tube, closure means for said housing pivotally mounted on said member, said member, said closure means, and said fuse means constituting a unitary assembly, means movable parallel to the axis of said fuse tube to break said fuse link, means operatively engaging said closure means and said link break means for multiplying a force imparted to said closure means urging it to open position into a greater force tending to break said fuse link, motion translating means between said force multiplying means and said link break means for converting the output movement of said force multiplying means into movement of said link break means parallel to the axis of said fuse tube, releasable means for normally latching said member in a position wherein said fuse means is in engagement with said first and second terminal means, said closure means being operable between open and closed positions while said member is latched.

11. A housed fuse cutout comprising, in combination, an insulating housing, first and second electrical terminal means disposed within said housing, a member releasably pivoted on said housing, fuse means for electrically bridging said first and second terminal means and including a fuse tube affixed to said member and a mechanically rupturable fuse link within said fuse tube, closure means for said housing having an arm extending transverse to the axis of said fuse tube pivotally mounted on said member, said member, said closure means, and said fuse means constituting a unitary assembly, means engaging said arm and movable parallel to the axis of said fuse tube in response to pivotal downward movement of said arm, incident to opening of said closure means, to break said fuse link, releasable means for normally latching said member in a position wherein said fuse means is in engagement with said first and second terminal means, said closure means being operable between open and closed positions while said member is latched and said latching means having a member accessible from the exterior of said housing when said closure means is in closed position adapted when actuated to release said latching means and thus permit removal of said assembly from said housing.

12. A housed fuse cutout comprising, in combination, a housing, first and second terminal means disposed within said housing, a member releasably pivoted on said housing, fuse means affixed to said member for electrically bridging said first and second terminal means, said fuse means including a fuse tube and a mechanically rupturable fuse link within said fuse tube, closure means for said housing pivotally mounted adjacent one end thereof on said member, means adapted, when operated, to break said fuse link, and releasable means for normally latching said member in a position wherein said fuse means is in engagement with said first and second terminal means, said pivotally mounted closure means having tool engaging means adjacent the end opposite said pivotal mounting and accessible from the exterior of said housing, thereby permitting opening of said closure means, said closure means being connected to said link break means at a point intermediate said pivotal mounting and said tool engaging means, whereby a mechanical advantage is provided which multiplies a force applied at said tool engaging means tending to move said closure means to open position into a greater force tending to break said fuse link.

13. A housed fuse cutout comprising, in combination, a housing, first and second electrical terminal means within said housing, a unitary assembly including a body member and closure means for said housing having a laterally projecting arm pivotally mounted on said body member and having an opening therein, interengaging trunnion and bearing means between said housing and said body member for releasably pivoting said body member on said housing, said body member having a fuse tube receiving bore and an elongated aperture parallel to the axis of said bore, said assembly also including fuse means for electrically bridging said first and second terminal means including a fuse tube affixed to said body member within said bore and a mechanically rupturable fuse link within said fuse tube, a cylindrical member surrounding said fuse tube and engaging said fuse link and having laterally extending ear means projecting into said elongated aperture and permitting movement of said cylindrical member only parallel to the axis of said fuse tube and also projecting into said opening in said arm, said opening being of a configuration to convert arcuate movement of said arm into rectilinear movement of said ear means and said cylindrical member parallel to the axis of said fuse tube, and means for normally releasably latching said assembly in a position wherein said fuse means is in engagement with said first and second terminal means.

14. A selectively operable housed fuse cutout comprising, in combination, a housing, first and second terminal means disposed within said housing, an assembly releasably pivoted on said housing and including closure means for said housing and fuse means pivotable relative to said closure means for electrically bridging said first and second terminal means, said fuse means including a fuse tube and a mechanically rupturable fuse link within said fuse tube, means adapted, when operated, to break said fuse link, releasable means for normally latching said assembly in a position wherein said fuse means is in engagement with said first and second terminal means and being releasable to unlatched position to permit removal of said assembly from said housing independent of said closure means and said link break means, said link break means being operable from the exterior of said housing while said assembly is latched.

15. A housed fuse cutout comprising, in combination, a housing, first and second electrical terminal means disposed within said housing, an assembly releasably pivoted on said housing and including fuse means for electrically bridging said first and second terminal means, said fuse means including a fuse tube and a mechanically rupturable fuse link within said fuse tube, said assembly also including closure means for said housing pivotable relative to said fuse tube, means adapted, when operated, to break said fuse link, and releasable means for normally latching said assembly in a position wherein said fuse means is in engagement with said first and second terminal means, said link break means being operable and said latch means being releasable to unlatched position in response to downward pivotal opening movement of said closure means, said latching means being unlatched subsequent to the breaking of said fuse link.

16. A housed fuse cutout comprising, in combination, an insulating housing, first and second electrical terminal means disposed within said housing, an assembly releasably pivoted on said housing including fuse means for electrically bridging said first and second terminal means, said fuse means comprising a fuse tube and a mechanically rupturable fuse link within said fuse tube, releasable means for normally latching said assembly relative to said housing in a position wherein said fuse means is in engagement with said first and second terminal means, link break means including a cylindrical member disposed in surrounding relation to the lower portion of said fuse tube engaging a portion of said mechanically rupturable fuse link and formed with at least one transversely projecting ear, said assembly also including closure means for said housing having an arm extending transverse to the axis of said fuse tube and pivotable relative to said fuse tube, means on said arm engaging said ear and adapted to move said ear and said cylindrical member in a direction parallel to the axis of said fuse tube to break said fuse link in response to pivotal downward opening movement of said closure means, and means including a connecting member engaging said latching means and having an elongated slot therein adapted to receive said ear for releasing said latching means when said connecting member is actuated, said elongated slot being of sufficient length so that said ear moves freely therein incident to downward pivotal movement of said closure means and said arm and said ear engages the end of said slot only after said ear and said cylindrical member are moved a sufficient distance to break said fuse link, further movement of said ear after said pin engages the end of said slot actuating said connecting means to release said latching means.

References Cited in the file of this patent

UNITED STATES PATENTS

| | | |
|---|---|---|
| 2,400,850 | Steinmayer et al. | May 21, 1946 |
| 2,672,539 | Steinmayer | Mar. 16, 1954 |
| 2,680,171 | Curtis et al. | June 1, 1954 |
| 2,744,982 | Smith et al. | May 8, 1956 |
| 2,820,868 | McCloud | Jan. 21, 1958 |
| 2,835,764 | Earle | May 20, 1958 |
| 2,836,681 | Bracey | May 27, 1958 |
| 2,843,704 | Wood | July 15, 1958 |